Dec. 15, 1942.  M. WATTER  2,304,976
SPOT WELDED SHEET MATERIAL
Filed Sept. 7, 1939  2 Sheets-Sheet 1
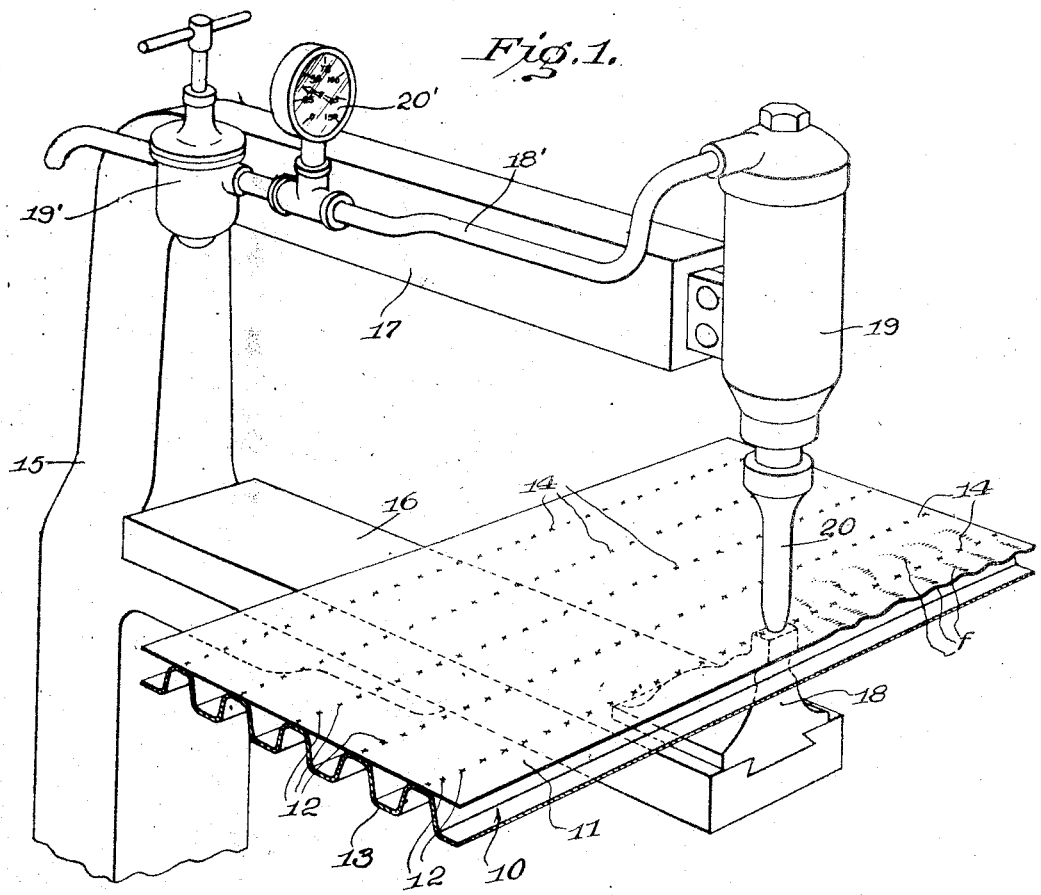
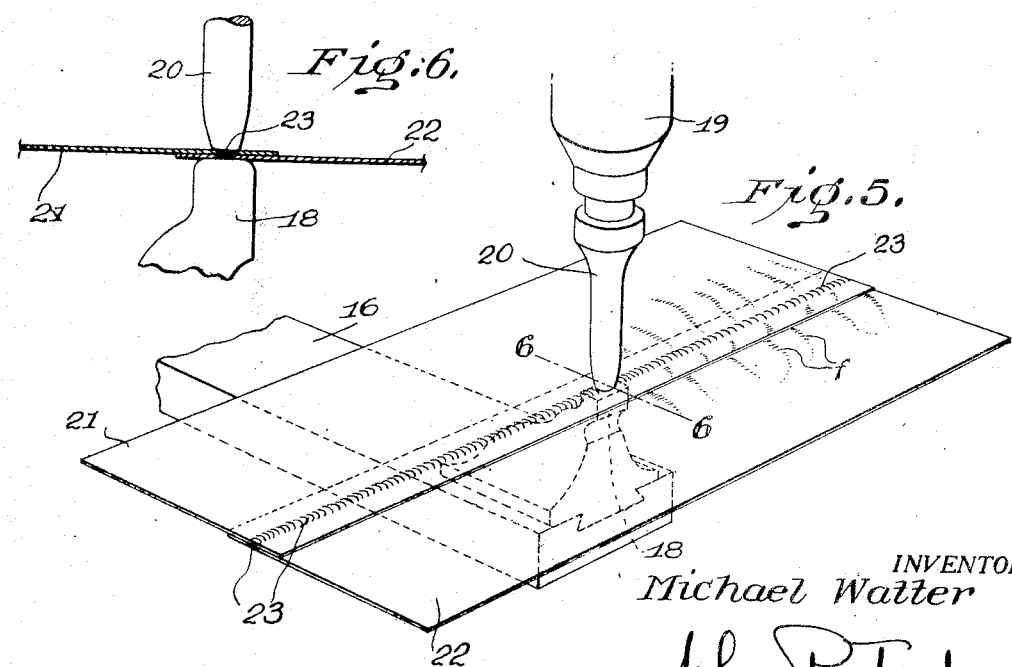
INVENTOR
Michael Watter
BY John P. Taubox
ATTORNEY

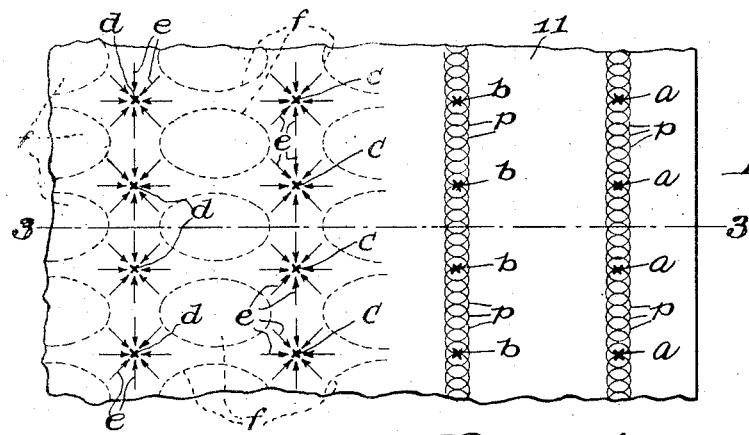
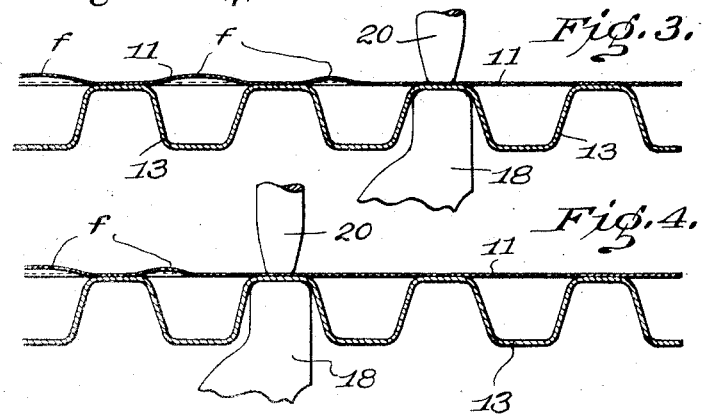
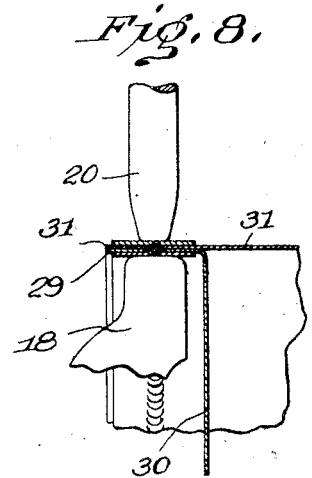
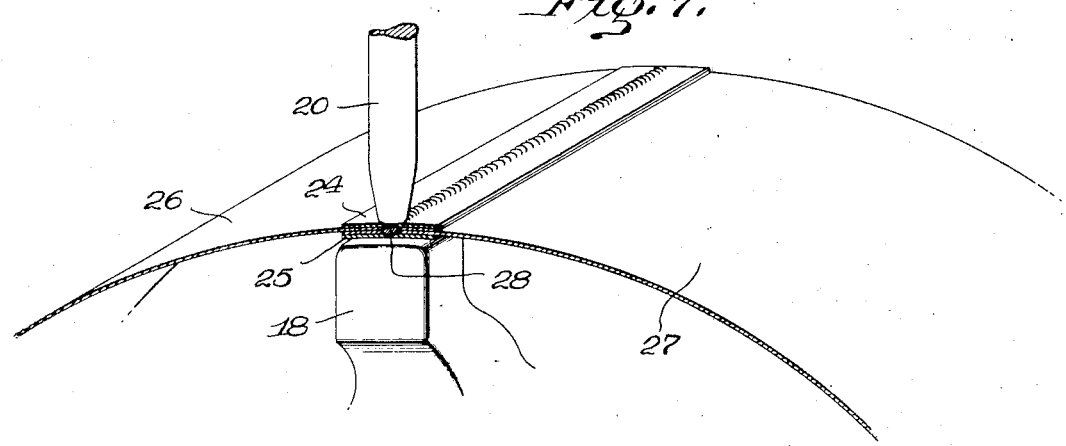

Patented Dec. 15, 1942

2,304,976

UNITED STATES PATENT OFFICE 2,304,976

SPOT WELDED SHEET MATERIAL

Michael Watter, Philadelphia, Pa., assignor to Edward G. Budd Manufacturing Co., Philadelphia, Pa., a corporation of Pennsylvania Application September 7, 1939, Serial No. 293,751

2 Claims. (Cl. 148—12)

The present invention relates to relieving electrical resistance spot welded sheet material from temperature or welding stresses resulting from such welding and to spot welded sheet material having the weld stresses removed therefrom.

An object of the invention is to relieve spot welded sheet material of weld stresses by subsequent cold working and the invention is applicable to both spaced spot welds, or overlapping spot welds, as in a seam weld, whereby unsightly waves or bulges in the sheet metal parts between and adjacent the welds are substantially eliminated and the strength of the portion of the metal softened by the welding is restored, the cold-working being effected at the welds to relieve temperature stresses caused by shrinkage of material at the welds.

Another object of the invention is to accomplish the cold-working by peening the metal at the welds in order to upset and spread the welded portions of the metal an amount substantially equal to the shrinkage caused by the welds.

A further object is to extend the peening operating in a continuous line, each peen overlapping another along the rows of welds for assuring in practice the peening of every weld in a row and for applying the same density of peening on each weld for relieving the temperature stresses and for strengthening the metal equally at each weld through cold-working throughout an entire row.

A further object of the invention is to peen along a row of slightly spaced welds in hardened metal, said peening being performed at and between said welds in said row for causing a general elongation of the metal along and throughout the entire row of welds, the elongation being greatest at the welds and the total elongation being such as to restore the original length of the material along the row existing prior to welding.

A still further object is the provision of an extra layer of thin material in the form of a backing strip extending along the line of welds and positioned to the side of either or both thin sheet metal parts attached together by said welds, the welds extending through said sheet metal parts and said backing strip or strips after which said welds are peened for restoring material strength and relieving stresses tending to produce ripples or buckles in said thin sheet metal parts.

It is also an object of the invention to include a peening operation with a welding operation of the character indicated which is of exceptionally simple nature, the apparatus for accomplishing the peening being of a structure which may be manufactured economically, and which will efficiently remove waves and buckles caused by the stresses set up by welding.

With the foregoing and other objects in view which will be apparent as the description proceeds, the invention resides in the method as well as the construction and arrangement of parts, as hereinafter described and claimed, it being understood that changes can be made within the scope of what is claimed without departing from the spirit of the invention.

The invention is illustrated in the accompanying drawings wherein:

Figure 1 is a perspective view showing the peening operation on sheet metal parts spot welded together, Figure 2 is a diagrammatic fragmentary plan of sheet metal parts indicating stresses caused by spot welding, Figure 3 is also a diagrammatic view showing the same, being a vertical section on line 3—3 of Figure 2, Figure 4 is a view similar to Figure 3 showing the peening operation progressed to the next row of welds, Figure 5 is a perspective view showing the peening operation on thin sheet metal parts, seam welded together, Figure 6 is a fragmentary vertical section taken on line 6—6 of Figure 5, Figure 7 is a perspective view showing the peening operation on sheet metal parts, seam welded together with backing strips on opposite sides of said thin sheet metal parts, and Figure 8 is a sectional view of the same type of weld as shown in Figure 7 being peened, with the shape of the thin metal parts being somewhat different.

Referring to the drawings and more particularly to the form shown in Figures 1 to 4 inclusive, the numeral 10 designates a unit of manufacture consisting of a flat extremely thin sheet 11 of stainless steel such as used for aircraft skin surface attached by means of electric resistance spot welding, as at 12, to a corrugated member 13 also made of sheet stainless steel and of slightly greater thickness. The spaced raised loops of the corrugated strip 13 adjacent the flat thin sheet 11 determine the space between the rows 14 of welds, while the welds 12 in each row 14 are spaced considerably closer together as clearly shown in Figure 1.

The shrinkage stresses resulting from welds 12 attaching the sheets 11 and 13 together cause the thin sheet 11 to buckle between the rows of welds 14, the same being manifested by a considerable number of bulges and ripples, such as illustrated at F. As the sheet 11 is of stainless steel with a highly polished reflecting surface, unevenness in surface is greatly amplified in appearance and is exceptionally noticeable, thus presenting a surface very unpleasing to the eye.

Such waves or ripples are produced by shrinkage at each weld, which set up stresses pulling in all directions toward each weld, the shrinkage taking effect during the cooling after welding and being caused by the weld nugget being raised to a high temperature and being upset during welding, while bound in by relatively unheated metal, so that upon cooling, the nugget contracts, pulling at the immediately surrounding metal. Due to the extreme thinness and consequent lack of rigidity of the sheet 11 and the temperature stresses applied thereto, said sheet 11 bulges at places slightly spaced from the welds and not subjected to the contracting stresses, the spacing and association of the welds to one another determining the forms and characteristics of the bulges produced.

As previously stated, a purpose of the invention is to relieve the stresses at each weld in the thin sheet 11 to restore said sheet to its original flat state free from ripples or waves. In order to accomplish the above by cold-working, one form of peening apparatus is employed and as shown is constituted by a pedestal 15 having extending from one side thereof a pair of arms 16 and 17, the arm 16 carrying thereon a removable raised hardened head forming an anvil 18 on which the work 10 rests, while the other arm 17 supports an air hammer 19 of the usual rapid reciprocating variety. Fitted to the hammer 19 is a peening tool 20 positioned directly above the anvil 18 for receiving between the same and the anvil, the material 10 to be worked.

An air supply hose or tube 18' leads to the air hammer 19 and has arranged thereon an air regulating valve 19' and gauge 20' for controlling and determining respectively the amount of air to be supplied to the hammer, thus permitting adjustment so as to assure peening strokes of the desired amount of energy and rapidity for relieving the temperature stresses of any particular metal or thickness thereof.

By locating the raised head forming the anvil 18 in a raised loop of the corrugated sheet 13 the same will be properly positioned for backing up the peening operation and the loop of the corrugation will act as a centering guide for both the peening tool 20 and the anvil throughout the entire row of welds in said loop for assuring the cold-working of every weld throughout the row.

It is not necessary to feed the unit 10 in an intermittent manner necessitating dwelling at each weld, but instead the unit 10 may be gradually fed with a timing arranged with respect to the timing of the air hammer 19 so that each peen blow will overlap the preceding blow. The density of the peening blows can be varied by adjusting the air regulating valve 19' so that practically no effect is had on the hardened cold rolled stainless steel between the welds and only at the welds where annealing and softening due to welding has occurred does the major portion of the spreading or upsetting of metal take place. However, where softer sheet metal is employed the peening action may elongate the metal between the welds as well as at the welds. In such a case, the total elongation along a line of welds should bring the metal back in a substantially unstressed state to its original unstressed length along that line prior to welding.

In Figures 2, 3 and 4 I have shown diagrammatically the problem as presented and the manner in which the same is rendered. The bulges or waves are exaggerated in size merely for the purpose of presenting a clear illustration. Figures 2 and 3 show the first two rows of welds $a$ and $b$ as having been peened, said peening being indicated by the overlapped circles $p$ in Figure 2, while Figure 3 shows in addition to these two rows, row $c$ as peened. At the welds $c$ and $d$ in Figure 2 are shown arrows $e$ indicating the temperature stresses and the directions of pull of material in the thin sheet 11 towards the welds, thus producing bulges $f$ (shown by dotted lines in Figure 2) formed by slack material free from temperature stresses caused by the welding. It will be noted that the bulges appear greater at unattached places located between different welds. This is due to the fact that the stresses are short in length and do not extend out a sufficient distance from the welds to exert pulls throughout the entire mass between welds. The lack of stiffness due to the thin gauge of the sheet material 11 causes said sheet 11 to flex freely, which is a prime factor in producing the undesirable bulges.

Spot welds, as well as seam welds, are usually arranged in rows with the welds spaced a slight distance apart compared with the space between different rows of welds. This produces a general shrinkage along the rows of welds leaving slack metal between the rows, which flexing causes the waves or bulges as diagrammatically indicated in Figure 2.

As temperature stresses are responsible for the bulges, and annealing of the material at the welds takes place at the time of welding, the annealed portions, including the weld nuggets, are advantageously cold-worked by the peening to spread the annealed portions to relieve the temperature stresses for upon spreading the welds with the peening process the annealed weld portions are cold-worked, resulting in restoring the strength at such places.

Referring now to Figures 5 and 6 there is shown the peening process applied to two pieces of thin sheet material 21 and 22 lapped over one another and seam welded along the line 23. In this type of weld the temperature stresses also appear due to shrinkage along the line of the welds which cause the thin sheets 21 and 22 to buckle forming waves or ripples extending away from the welds, which gradually merge into one another and finally blend into the mass of material but not without leaving an unsightly appearance.

A peening apparatus of the same type as shown in Figure 1 having an anvil 18 and a peening tool 20 may also be used to spread the annealed welded portions to relieve the temperature stresses. Remarkable results have been produced by peening on this type of weld.

Figure 7 shows the peening apparatus used in connection with the same type of weld shown in Figures 5 and 6 with the exception that backing strips 24 and 25 are attached at the overlapped portions of the thin sheet metal parts 26 and 27 and the welds 28 extend also through said backing strips. This type of joint has been found very successful in constructing fuel tanks of stainless steel sheet material for aircraft use. The peening operation is applied in the same manner as described in the previous forms with the same favorable results. It is to be noted that while the sheet metal parts 26 and 27 are referred to as separate members, they may be the same piece of sheet steel with its opposite ends attached together to provide the cylindrical side wall of the fuel tank.

In Figure 8 the same type of weld joint is illustrated as shown in Figure 7. However, in this figure I have shown the joint as applied to the flange 29 of a thin sheet metal wall 30 and to a thin sheet member 31. This type of construction may well be used in securing the end member to the cylindrical wall member of a stainless steel tank. In this form the unsightly waves or ripples would not appear to an appreciable degree in the member 30, but peening application has been found very desirable in such form for the benefit of cold-working the welded portions and restoring strength thereto to provide a sheet metal structure of uniform strength.

It will appear that where the cold-working is applied to a seam weld such as in Figs. 5-8, inclusive, the continuous cold-working along the length can be so adjusted as to substantially wipe out all trace of stresses introduced by the welding and consequently the welded joint is strengthened by the elimination of internal stresses as well as by the cold-working. In the forms of Figs. 1-4, the continuous cold-working along a line of welds gives an overall increase in length to compensate for such contraction as resulted from welding, but, since for practical reasons each weld is not individually cold-worked, and the intermediate metal is to some extent worked although so slight as to be hardly noticeable in some instances, an approximation results which for all practical purposes lends great improvement in the reduction of internal stress and to the appearance.

While several applications of the invention have been illustrated and described and these chiefly in conjunction with stainless steel, it is to be understood that the invention is not to be limited thereto, but may be applied in other forms as well and with other materials. As many changes may be made in the construction and arrangement of parts as will be apparent to those skilled in the art, reference will be had to the appended claims for a definition of the limits of the invention.

Having thus described my invention, what I claim as new is:

1. The method of treating a thin gauge sheet of metal having a row of resistance welds therein which as a result of the stresses created incident to the heating and cooling of the metal of the welded regions produced distortions in the unwelded metal of the sheet normal to the plane thereof and beyond said regions, which consists in peening the metal of the sheet along the row of welds with the successive peenings in substantially overlapping relation to permanently expand the same in the plane of the sheet to remove the distortion producing stresses and thereby substantially restore the distorted unwelded metal to its initial undistorted condition.

2. The method of treating a thin gauge sheet of metal having spaced rows of resistance welds extending in the same general direction which as a result of the stresses created incident to the heating and cooling of the welded regions in each row of welds produced distortions in the unwelded metal of the sheet between said rows of welds and normal to the plane of the sheet, which consists in peening the metal along each of said rows with the successive peenings substantially overlapping each other to permanently expand the same in the plane of the sheet and in directions sufficient to remove the distortion producing stresses and thereby substantially restore the unwelded metal between said rows to its initial undistorted condition.

MICHAEL WATTER.